2 Sheets—Sheet 1.
P. K. DEDERICK.
Baling-Press.
No. 7,984. Reissued Dec. 11, 1877.
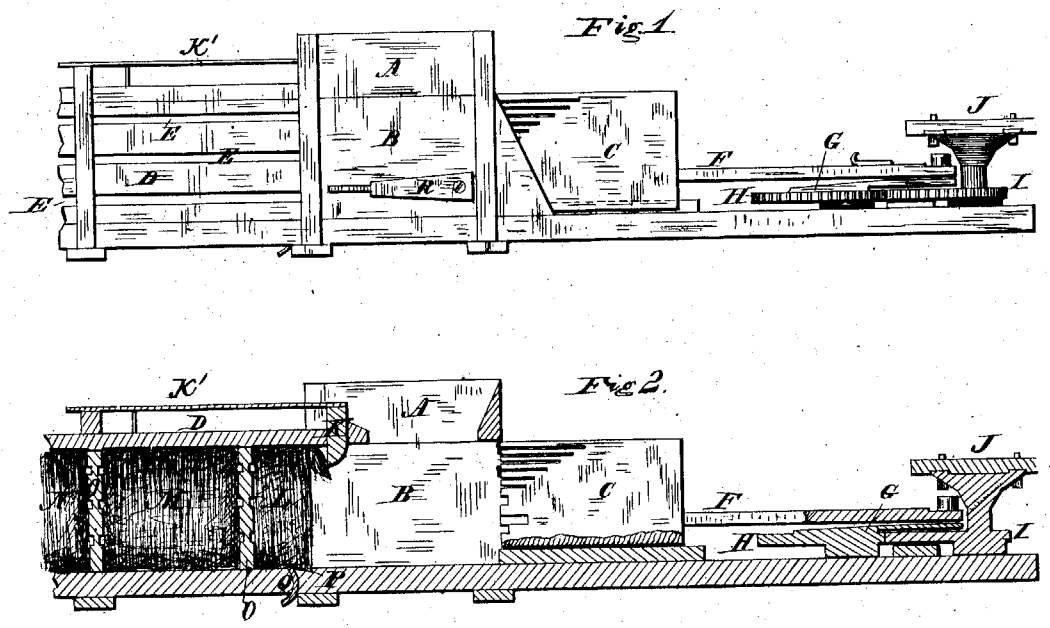
*Witnesses:*
Harry Berg
F. McKenny
*Inventor*
Peter K. Dederick,
By Hill Blenworth
His Attys.
THE NORRIS PETERS CO., WASHINGTON, D. C.

2 Sheets—Sheet 2.

P. K. DEDERICK.

Baling-Press.

No. 7,984. Reissued Dec. 11, 1877.

Witnesses.

Harry King del.

F. McKenny.

Inventor.

Peter K. Dederick

By Wm Kleinworth.

His Attys.

THE NORRIS PETERS CO., WASHINGTON, D. C.

UNITED STATES PATENT OFFICE.

PETER K. DEDERICK, OF ALBANY, NEW YORK.

IMPROVEMENT IN BALING-PRESSES.

Specification forming part of Letters Patent No. 132,639, dated October 29, 1872; Reissue No. 7,984, dated December 11, 1877; application filed July 27, 1877.

DIVISION B.

*To all whom it may concern:*

Figure 3:
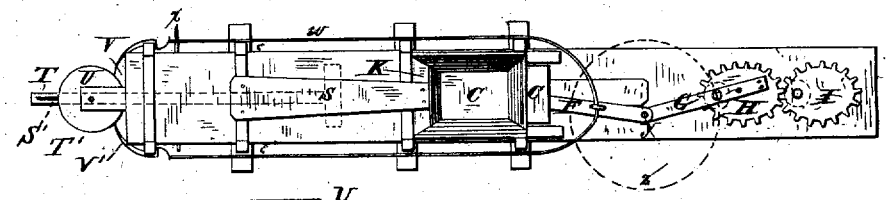
Figure 6:
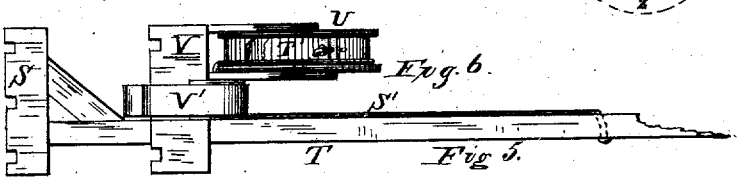
Figure 5:
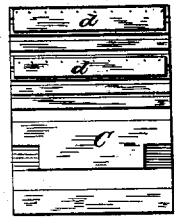
Figure 4:
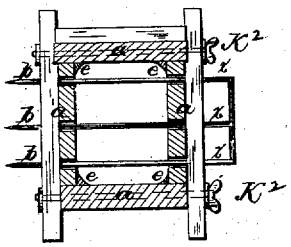

Be it known that I, PETER K. DEDERICK, of the city of Albany, in the county of Albany and State of New York, have invented a new and Improved Baling-Press, of which the following is a specification:

Figure 1 is a side view of the principal parts of the machine. Fig. 2 is a sectional elevation, showing the working parts and manner of operation. Fig. 3 is a top view, also illustrating the working parts and their operation. Fig. 4 is a sectional view of the end of the bale-chamber. Fig. 5 is a face view of the traverser, and Fig. 6 is a side elevation of the end door and its attachments.

In Fig. 1, A is the hopper, into which the loose hay or material is placed. B is the press-box, into which it falls by its own gravity, and in which it is pressed by the traverser C, and forced into the bale-chamber D. E E E are the tying-slots, through which ties are inserted, there being corresponding slots on the opposite side of the box. F is the pitman or staff of the traverser or connection to the crank G. H and I are spur-wheels, and J is the sweep, to which the horses are attached.

In Fig. 2 the same letters denote the same parts, as also in all the other figures.

K is the folder or doubler, which forces or doubles down the hay overlapping the traverser as soon as the traverser is withdrawn, thus forming the side of the bale smooth. This doubler may be of either roller or wedge form, and projected below the hopper and into the press-box, so as to turn down the ends, which are then secured by the next charge. This folder may be operated by a spring, as shown, or weight, or by attaching it to the traverser or power, if desired. L is the forming bale; M, the finished bale, and N the bale being discharged. O O are the grooved followers. P represents the shoulder for retaining the hay, and extends around the entire box. Q and R are retaining-guards, self-operating, and, further, secure the hay from expanding back, as does also the folder K.

Referring to Fig. 3, V is the end door, to which a curved metal strip, V′, is attached, with its ends projecting beyond the side edges of the door, and formed with shoulders to engage the two end uprights of the baling-chamber. The strip V′ is elastic, so that its shoulders shall spring over the uprights when the door is closed, and be detached therefrom when the requisite force is brought against the inner side of the door. S is the friction-follower, of a size to enter the chamber, and provided with a staff, T, which passes through the door. Its outer end is connected, by a rope or chain, S′, to a friction-strap, T′, passing around the periphery of a stationary block or wheel, U, secured to the outside of the door. When the bale within the baling-chamber is pressed against the friction-follower by the operation of the traverser, the follower is pushed back to the discharge end of the chamber, the staff T sliding through the door and drawing upon the rope S′, so as to turn the friction-strap upon its block until the follower is brought against the door, and the latter thrown open to discharge the bale. There must, of course, be part of a turn, or one or more turns, of the rope around the friction-strap, according to the distance the follower is to travel, for the purpose of producing the requisite leverage for turning the strap on the block. The strap is made adjustable by suitable means to regulate the friction on the block, and, therefore, the degree of force required for moving the follower. *w w* are ropes or chains connecting the ends of the curved door-strip V′ to the traverser or power, as shown in Fig. 3, so that after the end door is thrown open the backward movement of the traverser will close it or draw it again into the end of the chamber. This arrangement is not generally used, however, as the door is usually replaced by hand.

Fig. 4 is a view of the guard and tie-inserter as placed for use. The pitman F is connected with the crank G, which is attached to the spur-wheel H in a line from the axle or journal on which it turns in the direction of the nearest portion of the periphery, thus presenting the longest side or lever to the corresponding wheel I, which, being in the same position, must operate upon it with the short side or lever, thus greatly increasing the power when the material is hardest, and correspondingly diminishing it when no power is required, or, in other words, forming a progressive gearing.

The lever J is attached to the wheel I, or, when no increase of power is required, it may be attached to the crank G over the pitman at *y*, and is constructed to fit either place. An eccentric or cam may be used as an equivalent for the crank in operating the pitman, as its formation would be simply enlarging the journal of the crank, so as to reach or overlap the center, as shown by the dotted lines *z z*.

In Fig. 4, *a a a a* are the walls of the baling-chamber, which is made square or rectangular, with small concave or beveled pieces *e e e e* in the angles, for the purpose of rounding or removing the sharp corners of the bale when pressed.

In Fig. 5, *d d* are plates overlapping the spaces or slots in the traverser C, as shown, thus preventing the compressed hay from crowding between the slots, and securing free play to the springs when the hay overlaps the traverser.

In operation, the hay or other material is thrown into the hopper A, and falls of its own gravity into the press-box B, from whence it is forced into the bale-chamber D by the traverser C, thus forcing the friction-follower S back. Meantime the material for the next charge is thrown into the hopper on the top of the traverser, which thus forms an adjustable bottom to the hopper, and the operation is thus continued until the bale-chamber is filled. The bale is then tied off and the door V removed, and another bale formed in like manner against the other, thus ejecting it from the box. The operation is thus continued. The friction follower and staff is of no further use after the first bale, and is then removed.

This press is also a continuous baling-machine by a slight change in the operation, as follows: The first bale is pressed as in former case. The sides of the box E E are then set or screwed up, so as to impinge or form an additional friction on the bale, if required, when forced along by the new charges in forming the next bale, and the follower O, with tying-grooves, is inserted in the press-box in the rear of the finished bale, and forced with the bale, as at L M. The operation is continued until another bale is formed, when another follower is inserted, and the operation is still continued, thus forming a third bale while the second bale is being tied off and the first bale being ejected.

Having thus described my invention, I claim as follows:

1. The eccentric spur-wheels H and I operated by the sweep J, in combination with the toggle or crank G and pitman F, substantially for the purpose set forth.

2. The spur-wheels H and I, in combination with the toggle or crank G and pitman F and traverser C, substantially for the purpose set forth.

3. The follower S, staff T, friction-strap V′, and wheel U, combined and arranged substantially as described, for the purpose specified.

4. The follower S, staff T, friction-strap V′, and wheel U, in combination with the door V and bale-chamber D, for the purpose set forth.

5. The crank eccentric or cam G Z, connected to the reciprocating traverser C, and in combination with the press-case B D, provided with movable retainers, for the purpose set forth.

6. The toggle G F, connected to the traverser C, and combined with the gearing, and the press-case B D, provided with a yielding head or resistance, for the purpose set forth.

PETER K. DEDERICK.

Witnesses:
W. A. SKINKLE,
C. R. DEDERICK.